E. W. BULLARD.
CHUCK.
APPLICATION FILED OCT. 4, 1920.
1,368,889.
Patented Feb. 15, 1921.
2 SHEETS—SHEET 2.
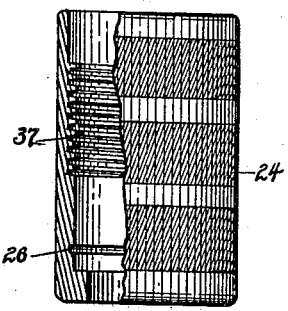
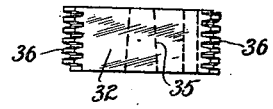
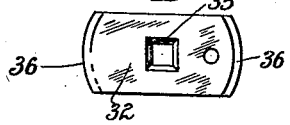
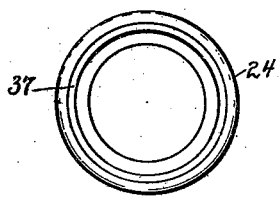
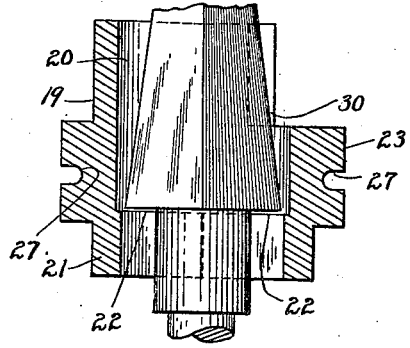
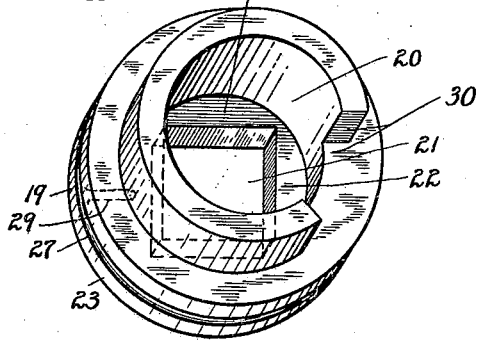
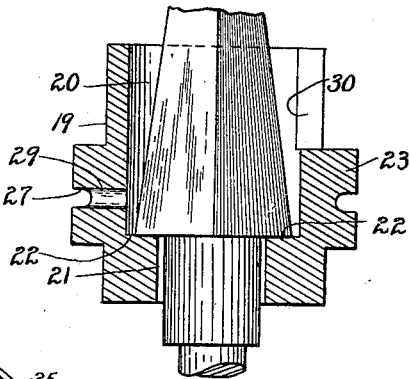
Inventor
Edwin W. Bullard
by Seymour & Pearce
atty.

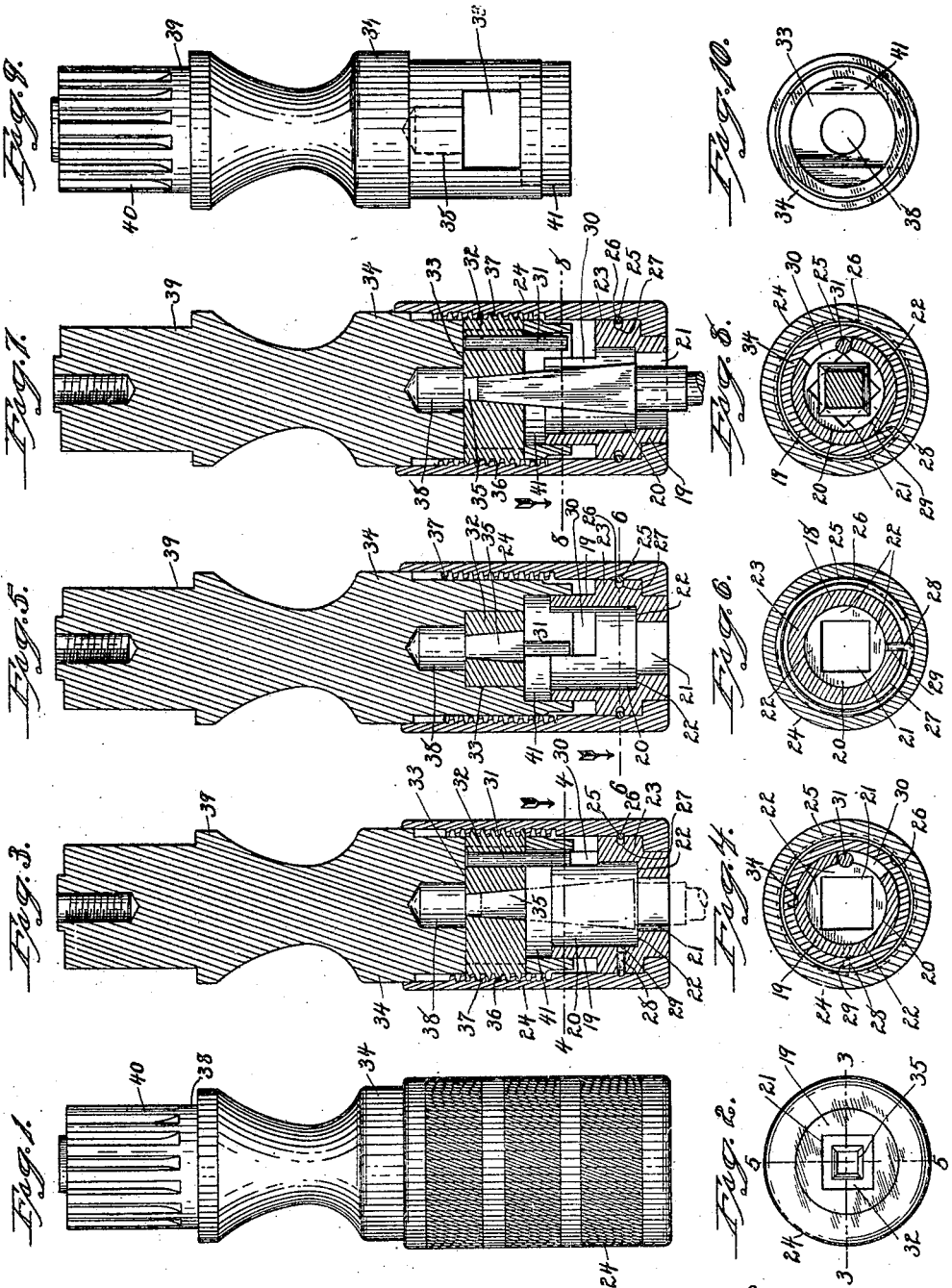

UNITED STATES PATENT OFFICE.

EDWIN W. BULLARD, OF WHITNEYVILLE, CONNECTICUT, ASSIGNOR TO WINCHESTER REPEATING ARMS CO., OF NEW HAVEN, CONNECTICUT, A CORPORATION.

CHUCK.

1,368,889.  Specification of Letters Patent.  Patented Feb. 15, 1921.

Application filed October 4, 1920. Serial No. 414,539.

*To all whom it may concern:*

Be it known that I, EDWIN W. BULLARD, a citizen of the United States, residing at Whitneyville, in the county of New Haven and State of Connecticut, have invented a new and useful Improvement in Chucks; and I do hereby declare the following, when taken in connection with the accompanying drawings and the characters of reference marked thereon, to be a full, clear, and exact description of the same, and which said drawings constitute part of this application, and represent, in—

Figure 1, a view in side elevation of a chuck embodying my invention.

Fig. 2, a reverse plan view thereof.

Fig. 3, a view thereof in central longitudinal section on the line 3—3 of Fig. 2, showing a tool-shank by broken lines.

Fig. 4, a view thereof in transverse section on the line 4—4 of Fig. 3.

Fig. 5, a view in longitudinal central section on the line 5—5 of Fig. 2.

Fig. 6, a view in transverse section on the line 6—6 of Fig. 5.

Fig. 7, a view in central longitudinal section corresponding to Fig. 3 but with a tool-shank as locked in place.

Fig. 8, a view in transverse section on the line 8—8 of Fig. 7.

Fig. 9, a detached view in elevation of the chuck-frame.

Fig. 10, a reverse plan view thereof.

Fig. 11, a detached view partly in section and partly in longitudinal section of the chuck-sleeve.

Fig. 12, a plan view thereof.

Fig. 13, an enlarged detached perspective view of the rotary locking-collar.

Fig. 14, a detached plan view of the split coupling-ring.

Fig. 15, a detached view in elevation of the driving-dog.

Fig. 16, a reverse plan view thereof.

Fig. 17, a detached view in central longitudinal section of the locking-collar showing a tool-shank inserted therein but prior to the locking rotation of the collar.

Fig. 18, a corresponding view showing the collar as rotated for locking the tool-shank.

My invention relates to an improved chuck of the class adapted for use with tools having polygonal shouldered shanks, the object being to produce a simple, positive, reliable and convenient mechanism of the class described, applicable for embodiment in chucks, bit-braces, drill-braces, drill-presses and kindred tools.

With these ends in view my invention consists in a chuck characterized by the use of a locking-collar instead of jaws. My invention further consists in a chuck having certain details of construction and combination of parts as will be hereinafter described and pointed out in the claim.

In carrying out my invention as herein shown, I employ a locking-collar 19, the cylindrical bore or chamber 20 having a floor which is formed with a rectangular opening 21, providing four locking-shoulders 22 within the collar at the bottom of its chamber. The said collar is also formed with an annular exterior rib 23 fitting within the inwardly-flanged outer end of a knurled operating-sleeve 24, within which the collar is retained with freedom of rotation therein, by a ring 25 lying partly within an internal circumferential groove 26 in the sleeve and partly within a deeper circumferential groove 27 in the rib. One end of the ring is turned inwardly to form a finger 28 in the collar, entering a hole 29, whereby the ring is coupled with the collar. The spring 25 acts to frictionally couple the collar with the sleeve for their rotation together within the limits of rotation permitted to the collar. For the purpose of limiting the rotation of the collar, it is formed with a segmental slot 30 receiving a stop-pin 31 mounted in a driving-dog 32 located in a transverse slot 33 (Fig. 9) formed in the frame 34. The said dog is formed with a central tool-shank socket 35 tapering in form, and shown here as square in cross section and at its ends with threads 36 engaged by internal threads 37 formed within the inner end of the operating-sleeve 24. The frame 34 is provided with the usual clearance hole 38 and with a chuck-head 39, here shown as cut to form ratchet-teeth 40. The lower end of the frame is formed with a circular recess 41 for the reception of the inner end of the collar.

In the use of my improved chuck, the shank of the tool is passed through the rectangular opening 21 of the collar 19 and firmly inserted into the socket 35 of the driving-dog 32. The operating sleeve is now turned, carrying with it the locking-collar 19 for one-eighth of a turn, which is sufficient to aline the locking-shoulders of the inserted tool-shank, as clearly shown in Figs. 8 and 18. The rotation of the collar is now arrested by the engagement with one of the walls of its segmental slot 30 of the stop-pin 31 carried by the driving-dog 32. The continued rotation of the sleeve moves the locking-collar longitudinally inward toward the driving-dog, without, however, rotating the collar, whereby the locking-shoulders 22 of the collar acting upon the shoulders of the shank of the tool, operate to jam the same into the socket 35 of the dog, which now functions to drive the tool, the turning of the sleeve 24 being continued until the shank is firmly seated and held. To remove the tool, it is only necessary to reversely rotate the sleeve, whereby the collar is positively moved away from its engagement with the shoulders of the shank of the tool. As soon as the friction between the collar and the shoulder of the tool is removed, the collar rotates for one-eighth of a turn, whereby its rectangular opening 21 is alined with the tool-shank which may now be removed from the chuck. What I wish to emphasize is that the entire rotary movement of the operating-sleeve for locking and unlocking the tool-shank is a small fraction of a complete revolution, which makes my chuck more convenient to use.

I claim:

A chuck having a frame provided with a transverse slot, a driving-dog located in the said slot, having threaded ends and provided with a polygonal socket, a sleeve applied over the frame and having internal threads engaging with the threaded ends of the said driving dog, and a locking-collar mounted in the outer end of the sleeve, with which it is frictionally coupled, and formed with locking-shoulders for engagement with the shoulders of a tool-shank, and means for limiting the rotation of the collar with the sleeve, by which the collar is moved positively toward and away from the said dog.

In testimony whereof, I have signed this specification in the presence of two subscribing witnesses.

EDWIN W. BULLARD.

Witnesses:
ERIK S. PALMER,
A. E. HODGSON.